Patented Nov. 16, 1926.

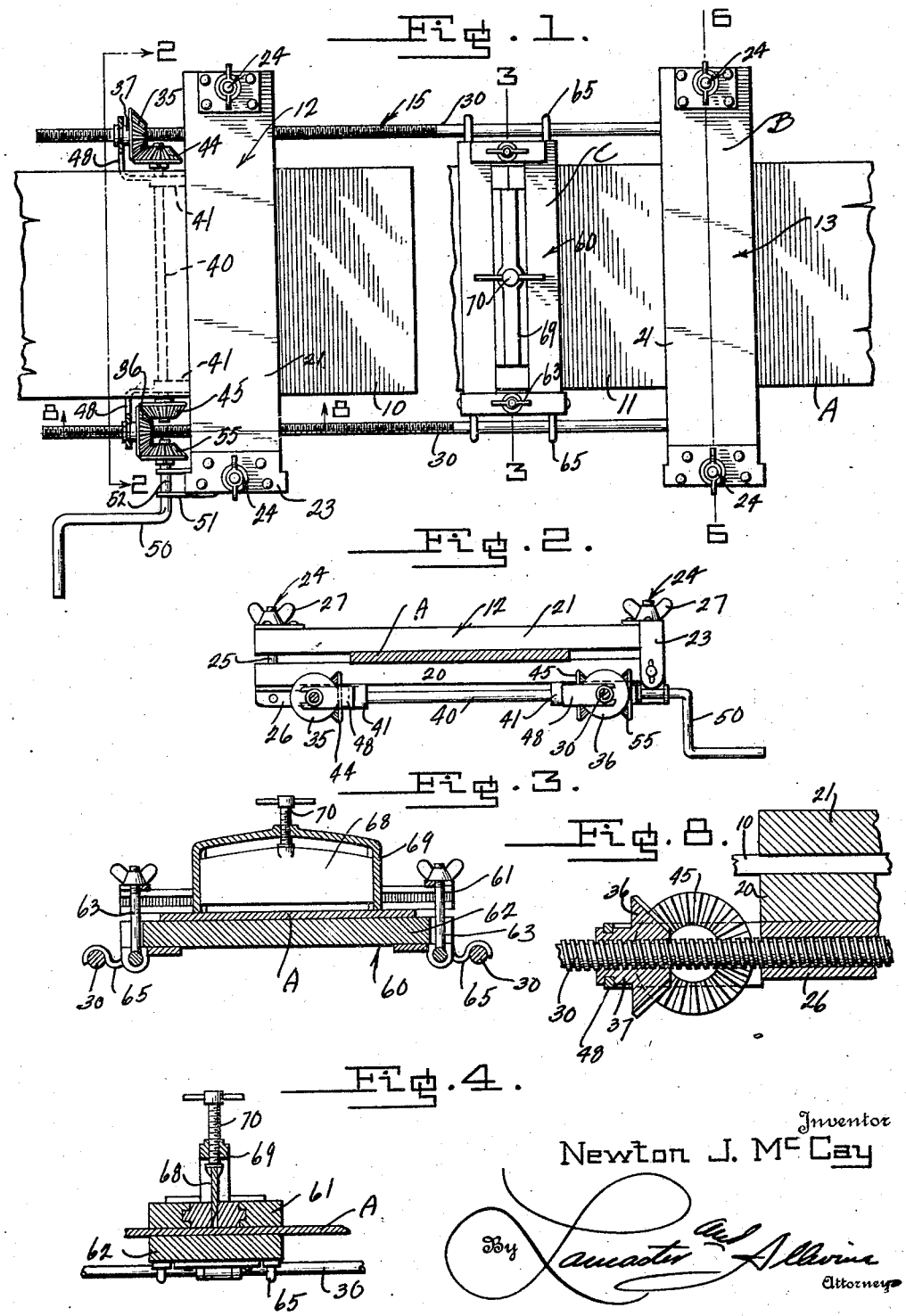

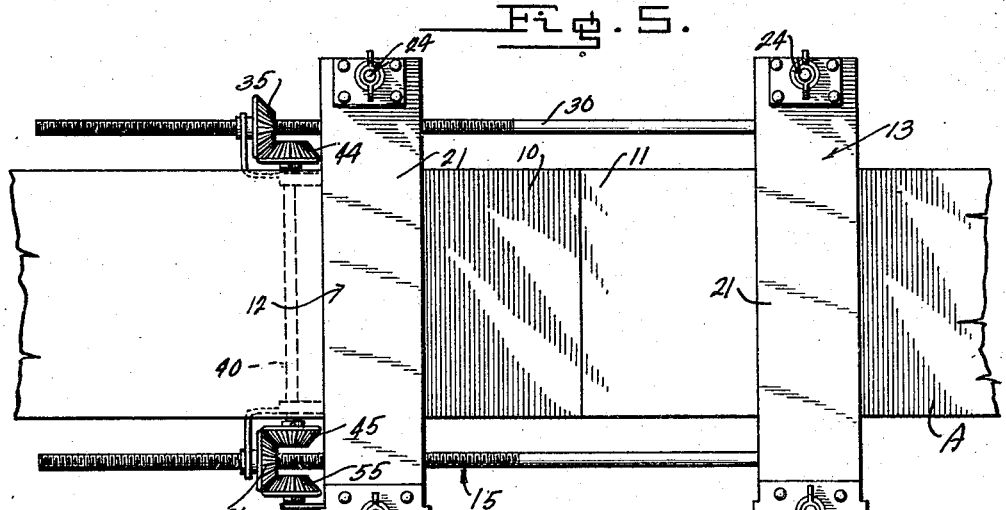
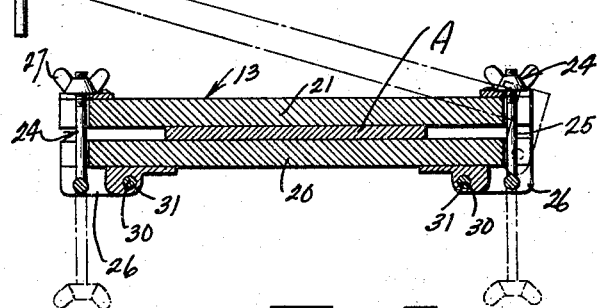
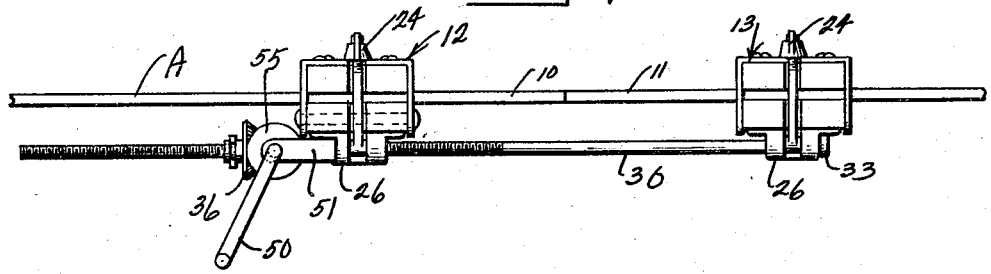

1,607,094

UNITED STATES PATENT OFFICE.

NEWTON JASPER McCAY, OF ONYX, CALIFORNIA.

HEAVY-DUTY-BELT ADJUSTER.

Application filed March 24, 1925. Serial No. 18,030.

This invention relates to improvements in belt adjusting mechanism.

The primary object of this invention is the provision of an improved belt adjusting mechanism which is particularly well adapted to be used in connection with heavy duty belts, embodying a very durable and efficient construction for bringing the ends of an endless belt into proximate engagement so that they may be connected.

A further object of this invention is the provision of a novel type of heavy duty belt adjuster, the same being an improvement over my heavy duty belt adjuster set forth in my Patent #1,414,428, granted May 2, 1922.

Other objects and advantages of this invention will be apparent during the course of the following detailed description.

In the accompanying drawings, forming a part of this specification, and wherein similar reference characters designate corresponding parts throughout the several views, Figure 1 is a plan view of the improved adjuster.

Figures 2 and 3 are cross sectional views taken substantially on their respective lines in Figure 1 of the drawings.

Figure 4 is a sectional view taken through a tool supported frame of the adjuster, which has been more particularly described in my patent above referred to.

Figure 5 is a plan view of the improved adjuster, showing it after the same has been adjusted to bring the ends of a belt into proximate engagement.

Figure 6 is a sectional view taken substantially on the line 6—6 of Figure 1.

Figure 7 is a side elevation of the improved adjuster as illustrated in Figure 5.

Figure 8 is a cross sectional view taken substantially on the line 8—8 of Figure 1.

In the drawings, wherein similar reference characters designate corresponding parts throughout the several views, the letter A may generally designate a belt of any approved character, adapted for heavy duty, upon which the improved adjuster B may be used for bringing the ends of the same into proximate connecting engagement. A cutter or other tool C may be supported by the adjuster B for operation upon the belt A, as is set forth in my patent above referred to.

The belt A is of leather, composition material, or the like, and the same may be used for heavy duty. These belts are sometimes very large, and incident to climatic conditions, stretching of the same, or for other reasons, it becomes necessary to shorten or lengthen the belt, and this necessitates severing of the same and bringing of the ends of the same into proximate connected engagement. To manually do this, without the aid of any tools, is practically impossible.

The improved adjuster B is used for bringing the ends 10 and 11 of the heavy duty belt A into a proximate connecting engagement. It comprises the clamping devices 12 and 13, adapted to be connected upon the ends 10 and 11 of the belt A, and including novel operating means 15, which comprises the principal novelty of this invention, in order to bring the clamping portions 12 and 13 together after they have been attached respectively to the ends 10 and 11 of the belt A.

Each of the clamps 12 and 13 comprise a lower jaw 20 and an upper jaw 21, which are hingedly connected at adjacent ends by means of a hinge piece 23. Swivel bolts and wing nut structures 24 are preferably provided at the ends of each of the clamps 12 and 13, as a means of clamping the jaws of said clamps into proximate engagement with the belt ends therebetween. These bolts and wing nut structures preferably comprise bolts 25, which are swivelly connected to brackets 26 of the bottom piece 20; said swivel bolts 25 being adapted to swing upwardly into end recesses in the upper piece 21, to receive wing nuts 27 above the said upper piece 21, substantially as is illustrated in the drawings, and as is specifically set forth in my patent above referred to. The brackets 26 are cast steel, or any other type of metal, and are securely affixed in any approved manner to the bottom surfaces at the ends of the lower piece 20 of both the clamps 12 and 13.

Referring to the operating means 15, the same preferably comprises a pair of relatively long guide rods 30, preferably carried in a fixed relation through suitable openings 31 in the brackets 26 of the clamp 13; said guide rods 30 extending at right angles to the clamp 13, in parallel relation. If desired, they may be made slidable in the openings 31 to enable the detachment therefrom, having heads 33 for abutment against the brackets 26. For the major length thereof these rods 30 are screw threaded, to the free ends thereof. Said guide rods extend through openings provided in the brackets 26 below the clamp 12; the said rods having a sliding fit in said brackets 26, preferably loose enough to not mar the screw threads of the guide rods as the clamps 12 and 13 are moved with respect to each other.

Bevel gears 35 and 36 are threaded upon the threaded portions of said guide rods 30; said bevel gears preferably including shank portions 37 having screw threaded openings therethrough, to receive the guide rods, so that upon adjustment of the said bevel gears 35 and 36 they will be fed longitudinally of said guide rods.

The bevel gears 35 and 36 are rotatably supported upon the guide rods at the opposite side of the clamp 12 from the clamp 13; with the teeth of said bevel gears converging toward the clamp 12. Said bevel gears 35 and 36 are adapted for synchronous operation, and to this end a shaft 40 is rotatably supported by brackets 41; said brackets 41 being rigidly connected with the jaw 20 of the clamp 12, and at its ends preferably supporting bevel gears 44 and 45 in meshing relation with the bevel gears 35 and 36 respectively. The bevel gears 35 and 44 are held in meshing relation, as are also the bevel gears 36 and 45, by means of right angled bracket extensions 48 connected with the bearing extensions 41 and receiving the bevel gear collars 37 in journaled engagement therein, substantially as is illustrated in Figures 1 and 5 of the drawings.

A crank member 50 is rotatably supported by means of a bracket 51, at an end of the clamp 12, preferably upon the lowermost jaw 20; said crank including a shaft portion 52 supported by the bracket 51 in alignment with the shaft 40; said shaft portion 52 having a bevel gear 55 in meshing engagement with the bevel gear 36, at the opposite side of said bevel gear 36 from the meshing engagement therewith by the gear 45.

Referring to the operation of the improved adjuster B in order to draw the ends 10 and 11 of the belt A together, the clamps 12 and 13 are attached to the sections 10 and 11 as above mentioned, with the free ends of the belt extending into the space between said clamps. The operating means 15 having, of course been assembled upon the clamps as above mentioned, it is merely necessary to rotate the hand crank 50, and this causes the bevel gears 35 and 36 to feed longitudinally on the screw threaded portions of the guide rod 30, for the purpose of moving the clamps 12 and 13 towards or away from each other. Incident to the angular arrangement of the bevel of the gears, and to the force with which the screw threads of the bevel gears 35 and 36 engage the guide rods, it can readily be understood that a very durable arrangement has been provided, and one which may be easily operated by the handle crank 50 in order to bring the ends of the belt together, notwithstanding the power necessary to bring the belt ends together. I am aware that it is old to operate mechanisms by means of bevel gears, but in the present instance it is moved to adjustably position the bevel gears similar to nuts upon the screw threaded guide rods, and to transmit the force incident to the operation directly upon the bevel gears, incident to the novel arrangement of the operating mechanism.

The guide rods 30 and 31 are not screw threaded for their entire length, but have smooth portions thereof adjacent the forward clamp 13, and upon these smooth portions the cutter tool or device is adapted to be mounted. This device C preferably comprises a frame 60, including upper and lower jaws 61 and 62 respectively, which include clamping means 63 by means of which to clamp the belt A therebetween. The lower jaw 62 may include supporting clips or brackets 65 adapted to engage over the smooth portions of the guide rods 30 and 31 in order to support the device C in the relation described. A cutter blade 68 may be reciprocably carried by a frame 69 rigid with the top jaw 61; this frame 69 being adjustable longitudinally of the tool C, to effect the belt cutting operation, in the manner set forth in my patent above referred to; the blade 68 also being adjustable into engagement with the belt by means of a feed screw 70.

From the foregoing description of this invention it is apparent that a novel type of heavy duty belt adjuster has been provided, which includes novel operating details to render the same more efficient in operation.

Various changes in the shape, size, and arrangement of parts may be made to the form of invention herein shown and described, without departing from the spirit of this invention or the scope of the claims.

I claim:

1. In a belt adjuster of the class described a pair of clamp devices adapted to be attached to the opposite ends of a belt, a pair of spaced screw threaded rods connected with one of said clamp devices and extending towards the other clamp device, a bevel gear nut adjustable on each of the screw threaded rods at the opposite sides of the last mentioned clamp device from that clamp device to which the rods are attached, a shaft rotatably carried by and rearwardly of that clamp device which is adjacent said bevel gear nuts, and bevel gears carried by said shaft between the rods and in meshing engagement with the bevel gear nuts of said rods whereby to operate said bevel gear nuts in synchronous manner upon said rods.

2. In a belt adjuster a pair of clamp devices adapted for attachment to the opposite ends of a belt, each clamp device including an upper and a lower jaw, brackets on the lower jaw of each clamp device, a pair of spaced screw threaded relatively long rods carried in fixed relation by the brackets of the lower jaw of one of said clamp devices and extending in slidable relation through the brackets on the lower jaw of the other clamp device, bevel gear nuts adjustably threaded on said screw threaded rods at the opposite side of the last mentioned brackets from that clamp device to which the rods are attached, a shaft rotatably carried by the lower jaw of said clamp device adjacent said bevel gears, bevel gears carried by said shaft meshing with each of the bevel gear nuts of said rods, a crank rotatably supported by said clamp device adjacent one of said bevel gears, and a bevel gear carried by said crank meshing with the bevel gear nut of one of said rods.

3. In a belt adjuster the combination of a pair of clamp devices adapted to be attached to the opposite ends of a belt, each of the clamp devices including an upper jaw and a lower jaw, a pair of spaced screw threaded relatively long rods carried in fixed relation at an end of each by the lower jaw of one of said clamp devices, the lower jaw of the other clamp device having apertured brackets thereon at the lower surface thereof thru which the screw threaded rods slidably extend, a bevel gear nut adjustably threaded on each of said screw threaded rods at the opposite sides of the brackets from that clamp device to which the rods are attached, a short shaft rotatably carried by the lower jaw which has the brackets thereon rearwardly of the said lower jaw and at its ends terminating in spaced relation adjacent the nuts, bevel gears on the ends of said short rod and rearwardly of the clamp device which has said brackets thereon in meshing relation with the said bevel gear nuts at the inner sides of the screw threaded rods whereby to connect said bevel gear nuts for synchronous rotation, and means for rotating said short shaft.

4. In a belt adjuster the combination of a pair of clamp devices adapted to be attached to the opposite ends of a belt, each of the clamp devices including an upper jaw and a lower jaw, a pair of spaced screw threaded relatively long rods carried in fixed relation at an end of each by the lower jaw of one of said clamp devices, the lower jaw of the other clamp device having apertured brackets thereon at the lower surface thereof thru which the screw threaded rods slidably extend, a bevel gear nut adjustably threaded on each of said screw threaded rods at the opposite sides of the brackets from that clamp device to which the rods are attached, a short shaft rotatably carried by the lower jaw which has the brackets thereon rearwardly of the said lower jaw and at its ends terminating in spaced relation with the nuts and having bevel gears at the ends of said short rod and rearwardly of the clamp device which has said brackets thereon in meshing relation with each of said bevel gear nuts at the inner sides of the screw threaded rods whereby to connect said bevel gear nuts for synchronous rotation, and means for rotating said short shaft, comprising a crank shaft rotatably supported by the clamp device which is adjacent said bevel gears and at the outer side of one of said screw threaded rods, and a bevel gear connected with said crank shaft in meshing relation with the adjacent bevel gear nut and at the outer side of the adjacent screw threaded rod.

NEWTON JASPER McCAY.